Feb. 28, 1928.
S. E. RHOADS
1,660,626
BALL SPOTTING RACK
Filed Aug. 12, 1927
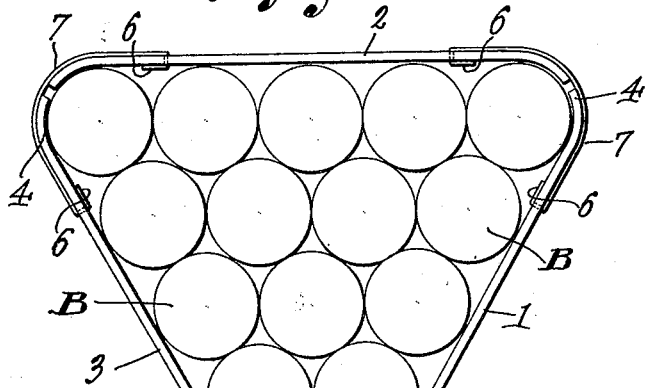
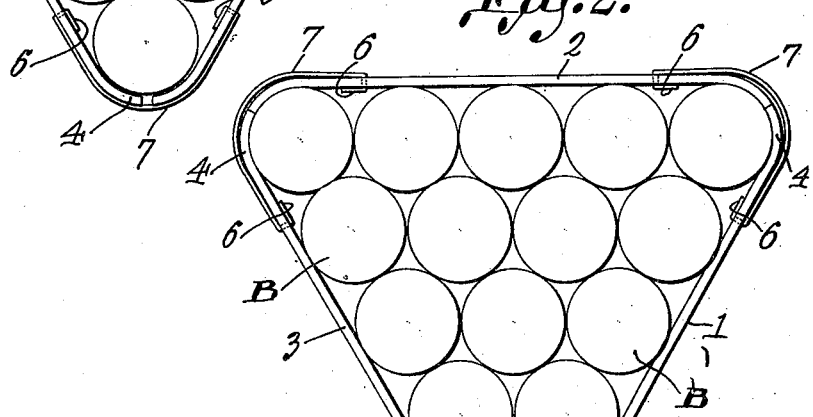
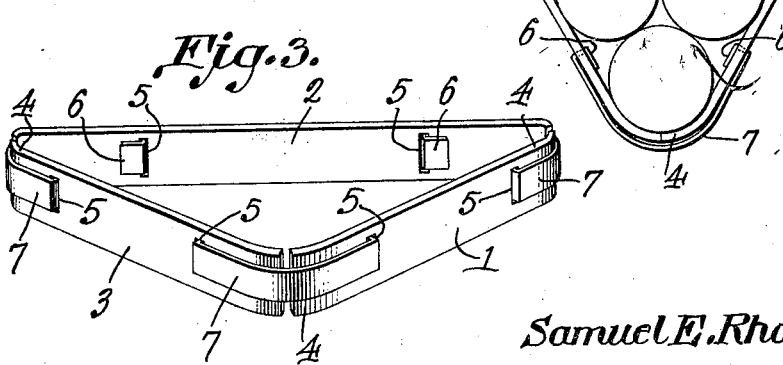
Samuel E. Rhoads, Inventor
By C. A. Snow & Co.
Attorneys Patented Feb. 28, 1928.

1,660,626

UNITED STATES PATENT OFFICE.

SAMUEL E. RHOADS, OF DENNISON, OHIO, ASSIGNOR OF ONE-FOURTH TO ALLAN E. METCALF AND ONE-FOURTH TO GEORGE W. METCALF, BOTH OF DENNISON, OHIO.

BALL-SPOTTING RACK.

Application filed August 12, 1927. Serial No. 212,562.

This invention relates to a rack for use in squeezing together or "freezing" pool balls, one of the objects being to provide a rack which can be slightly compressed for the purpose of properly assembling or spotting the balls and, when released, will expand so that the rack can be lifted freely without disturbing the balls.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed, without departing from the spirit of the invention.

In the accompanying drawings, the preferred form of the invention has been shown.

In said drawings,

Figure 1 is a plan view showing the rack assembled with a set of pool balls, said rack in its normal or expanded position so as to be lifted freely away from the balls.

Figure 2 is a similar view showing the rack contracted.

Figure 3 is a perspective view of the rack.

Referring to the figures by characters of reference 1, 2 and 3 designate strips of wood or other suitable material the ends of which are rounded as at 4 so as to come together when the rack is contracted. Formed in each of the strips near its ends are transverse slots 5 and seated in the slots are the hooked ends 6 of bowed springs 7. Three of these springs are provided, one for each corner portion of the rack and each spring bridges the meeting end portions of the two adjacent strips. The springs are constantly under tension and serve to hold the ends of the strips normally spaced apart as shown in Figures 1 and 3 with the adjacent portions of the outer faces thereof fitting tight against the inner surfaces of the springs. When the rack is thus expanded the area defined by the inner faces thereof is slightly greater than the area covered by the set of pool balls when properly assembled. In using the rack the balls are placed therein and after they have been brought to proper position the rack is contracted by pressing the strips toward each other. This will cause the ends of the strips to come together and the springs 7 to bow outwardly as shown in Figure 2. It will also cause the balls to be pressed tightly together or to "freeze". After the balls have thus been assembled the rack is relieved of pressure and will expand to the position shown in Figure 1. Thus it can be lifted without disturbing the balls, these balls being indicated at B in the drawings.

What is claimed is:

1. A substantially triangular pool ball spotting rack including separate strips constituting the respective sides of the rack and resilient means at each angle of the rack for connecting each end of each strip to the next adjoining strip, said means holding the strips normally spaced apart, all of the strips being shiftable toward each other to contract the rack.

2. A pool ball rack including separate strips, resilient means for holding the ends of each strip normally spaced from the ends of the adjoining strips, said means constituting the sole connections between the strips, the said rack being contractable against the action of said means.

3. A pool ball rack including separate strips having curved ends, bowed springs connected to the ends of each strip and to the adjacent ends of the next adjoining strip, said springs constituting means for holding the strips normally spaced apart.

4. A pool ball rack including strips having their ends laterally curved, bowed springs constituting the sole connections between the strips at the ends thereof, said springs being normally under tension to hold the strips normally spaced apart, said strips being shiftable toward each other to contract the rack against the action of the springs.

In testimony that I claim the foregoing as my own, I have hereto affixed my signature.

SAMUEL E. RHOADS.